United States Patent [19]

Haagh et al.

[11] Patent Number: 5,151,920
[45] Date of Patent: Sep. 29, 1992

[54] RADIO LAN STATION WITH IMPROVED FRAME DELIMITER DETECTION IN A SPREAD SPECTRUM ENVIRONMENT

[75] Inventors: Johannes P. N. Haagh, Eindhoven; Hans van Driest, Bilthoven; Gerrit Smit, Haaften, all of Netherlands

[73] Assignee: NCR Corporation, Dayton, Ohio

[21] Appl. No.: 757,392

[22] Filed: Sep. 10, 1991

[51] Int. Cl.[5] .................... H04L 27/30; H04L 9/00
[52] U.S. Cl. ............................................................ 375/1
[58] Field of Search .............................................. 375/1

[56] References Cited

U.S. PATENT DOCUMENTS

| | | | |
|---|---|---|---|
| 4,365,338 | 12/1982 | McRae et al. | 375/1 |
| 4,719,643 | 1/1988 | Beeman | 375/1 |
| 4,943,975 | 7/1990 | Kurihara et al. | 375/1 |
| 4,943,976 | 7/1990 | Ishigaki | 375/1 |
| 5,073,899 | 12/1991 | Collier et al. | 375/1 |
| 5,103,459 | 4/1992 | Gilhousen et al. | 375/1 |

*Primary Examiner*—Salvatore Cangialosi
*Attorney, Agent, or Firm*—James H. Beusse

[57] ABSTRACT

A radio LAN station is provided for receiving information frames including start and end delimiters and user data therebetween. The start and end delimiters include both data symbols and special non-data symbols. The data symbols and non-data symbols being transmitted to the radio LAN station are sent thereto via a spread spectrum signal. The data symbols and the non-data symbols are spread via first and second spreading codes, respectively. The receiving radio LAN station includes first and second correlators which respectively correlate the received spread spectrum signal against the first spreading code to retrieve the data symbols and against the second spreading code to retrieve the non-data symbols. Rectangular representations of the received data and non-data symbols are thus produced and are converted to polar form via appropriate rectangular to polar converters. The polar representations of the data and non-data symbols respectively exhibit a vector length Z and a vector length Z'. The receiving LAN station includes circuitry for determining that a symbol is a data symbol if $Z - Z'$ is greater than or equal to a constant A, or that a symbol is a non-data symbol if $Z - Z1$ is less than said constant A. In this manner, the data and non-data symbols representing the start and end delimiters are detected.

10 Claims, 4 Drawing Sheets

FIG. 5

RADIO LAN STATION WITH IMPROVED FRAME DELIMITER DETECTION IN A SPREAD SPECTRUM ENVIRONMENT

BACKGROUND OF THE INVENTION

This invention relates in general to Local Area Networks (LANs) and, more particularly, to radio LANs which operate in a spread spectrum environment.

Conventional wire-based LAN systems employ extensive fixed cabling to interconnect the multiple stations which form the networked system. The installation of such fixed cabling is difficult enough when performed concurrently with new building construction and is even more problematic when an existing structure must be retrofitted. In the resultant LAN using fixed cabling, the networked stations are constrained to installation at fixed locations which are dependent on such cabling.

To address these concerns and limitations, radio LANs have been developed which utilize radio links rather than cable to interconnect the network stations. Unfortunately, radio based LANs encounter another set of problems unique to the indoor radio environment. For example, radio LANs are susceptible to multi-path fading which can interfere with interstation communication. To alleviate the problem of multi-path fading, radio based LANs have been developed which employ spread spectrum transmitting and receiving technology.

Figure 1:
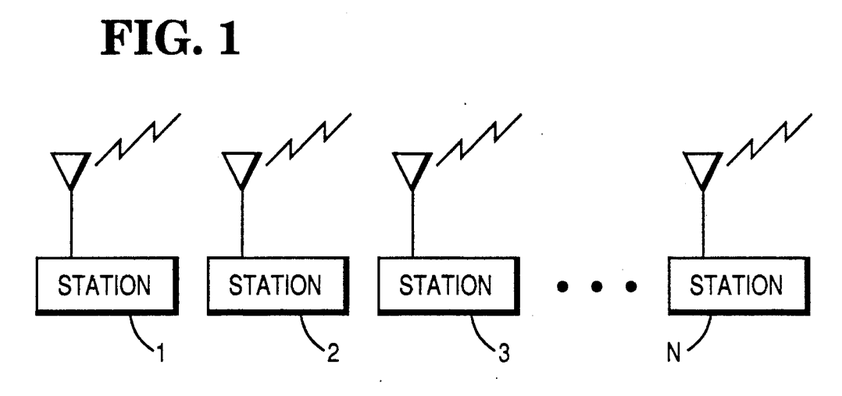
FIG. 1 is a block diagram of a conventional radio LAN computer system.
Figure 2:
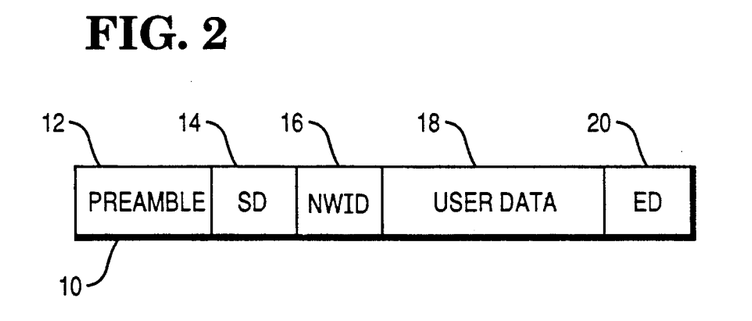
FIG. 2 is a representation of the frame format in a conventional radio LAN computer system.

FIG. 1 shows a conventional radio LAN including stations 1, 2, 3 ... N which are interconnected by a radio link. These stations each include radio transmitting and radio receiving portions (not shown). A LAN station typically transmits information in frames such as frame 10 shown in FIG. 2. Frame 10 includes a preamble 12, a start delimiter 14 designated SD, a network ID number 16 designated NWID, the user data 18 and an end delimiter 20 designated ED. In the radio LAN environment, there is a need for synchronization during the reception of the frame in order to recover the user data. To facilitate such synchronization, the start delimiter SD is transmitted preceding the synchronization sensitive part of the frame. More specifically, symbol synchronization is required to receive the network identification number NWID and the user data.

In addition to the need for symbol synchronization described above, there is also a need to transmit a firm point to specify the end of a frame. The end delimiter ED is transmitted to perform this function. It is thus seen that in frame 10 of FIG. 2, the start delimiter SD and the end delimiter ED specify the beginning and the end, respectively, of the information for which synchronization is required.

It is also desirable that the start delimiter and the end delimiter take a minimum number of symbols. Conventional delimiter protocols include using a fixed data pattern (flag) and applying zero insertion to prevent illegal flag detection in the user data part of the frame. Unfortunately, such delimiter protocols undesirably add to the length of the frame and therefore result in extra system overhead. Increasing the system overhead in this manner significantly decreases network performance of the radio LAN.

SUMMARY OF THE INVENTION

Accordingly, one object of the present invention is to provide a spread spectrum radio LAN station using a start delimiter and end delimiter protocol which does not significantly increase network overhead.

Another object of the present invention is to provide a spread spectrum radio LAN station wherein the start and end delimiters are differentiated from the remaining frame information with high reliability.

Yet another object of the present invention is to provide a spread spectrum radio LAN station using a start delimiter and end delimiter protocol wherein the detection of the delimiters is more reliable than the detection of data such that delimiter reliability does not significantly influence the frame error rate.

Still another object of the present invention is to provide a spread spectrum radio LAN station using a start delimiter and end delimiter protocol wherein the probability is low that a delimiter is detected when data was actually transmitted or that the delimiter is missed when a delimiter is actually transmitted.

In accordance with the present invention, a radio LAN station is provided for receiving information frames including start and end delimiters, the start and end delimiters including data symbols and non-data symbols. The data symbols and non-data symbols are transmitted via a spread spectrum signal and are spread via first and second spreading codes, respectively. The station includes analog to digital conversion circuitry adapted to provide a digital representation of a received spread spectrum signal. The station further includes a first correlating circuit, coupled to the analog to digital conversion circuitry, for correlating a digital representation of the spread spectrum signal against the first spreading code to produce a rectangular representation of the data symbols. The station also includes a second correlating circuit, coupled to the analog to digital conversion circuitry, for correlating a digital representation of the spread spectrum signal against the second spreading code to produce a rectangular representation of the non-data symbols. The station includes a first converter, coupled to the first correlating circuit, for converting the rectangular representation of the data symbols into a polar representation of the data symbols to produce a vector length Z representative thereof. The station still further includes a second converter, coupled to the second correlating circuit, for converting the rectangular representation of the non-data symbols into a polar representation of the non-data symbols to produce a vector length Z' representative thereof, The station also includes a circuit for determining that a symbol is a data symbol if Z—Z' is greater than or equal to a constant A, or that a symbol is a non-data symbol if Z—Z' is less than the constant A, such that the data and non-data symbols representing the start and end delimiters are detected.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings in which:

DETAILED DESCRIPTION OF THE INVENTION

Figure 3:
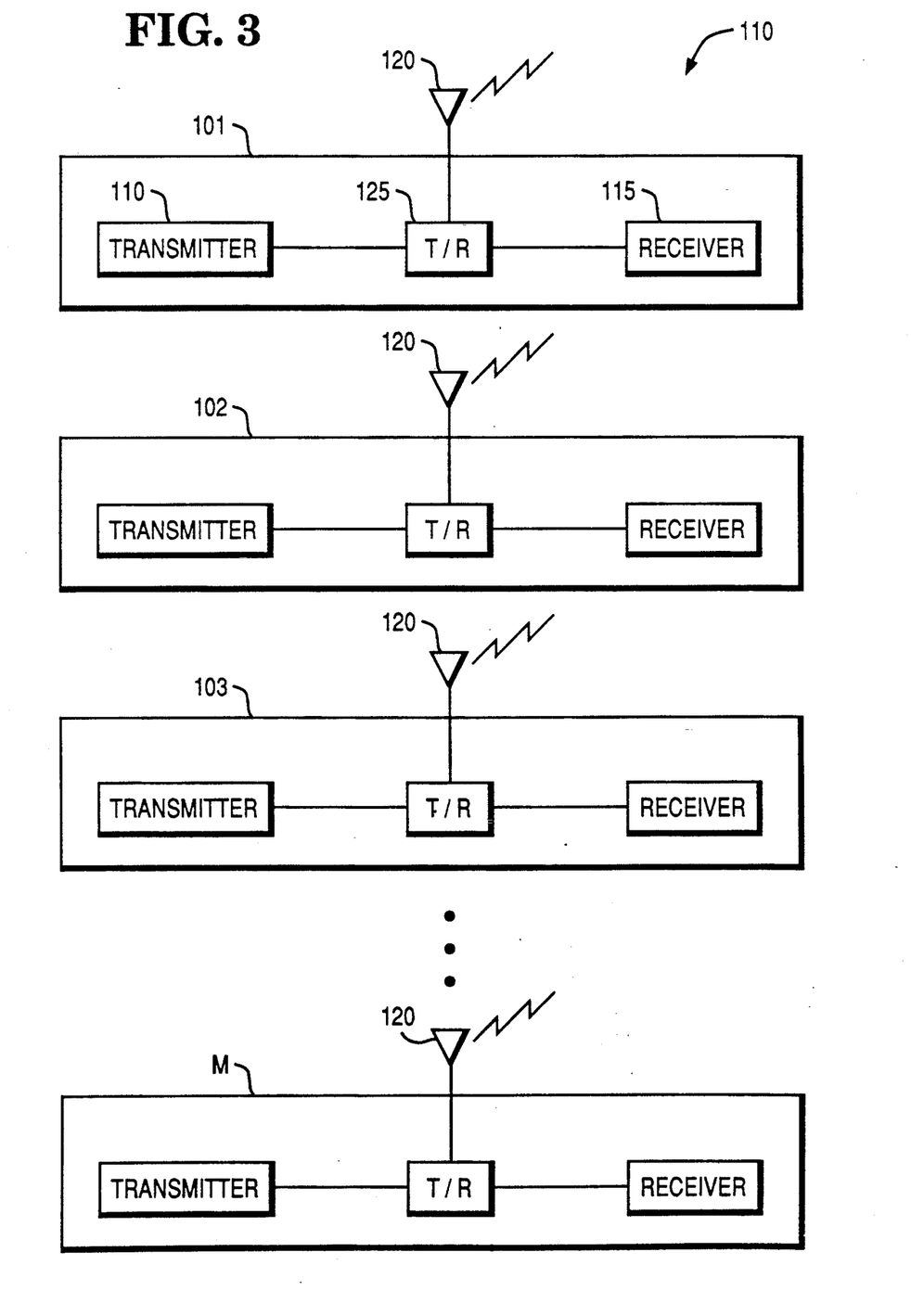
FIG. 3 is a block diagram of a plurality of radio LAN transceivers coupled together by a radio link in accordance with the present invention.

FIG. 3 shows a block diagram of a plurality of transceivers or stations designated 101, 102, 103 . . . M coupled together by a radio link to form a local area network (LAN) 110. By way of example, station 101 includes a transmitter 110 capable of spread spectrum transmission and a receiver 115 capable of spread spectrum reception as will be discussed in more detail subsequently. Transmitter 110 and receiver 115 are coupled to an antenna 120 by a conventional transmit receive (T/R) circuit 125 to permit the transmitter and receiver to share the same antenna. Stations 102, 103 . . . M are substantially identical to station 101.

In actual practice, station 101 may include an input device such as a keyboard (not shown) and an output device such as a display (not shown) as well as other optional input/output peripheral devices. Stations 101, 102, 103 . . . M employ spread spectrum technology to communicate with one another on a single radio channel. In an indoor embodiment of the invention, the stations typically transmit and receive on a channel in the 902-928 Mhz band although the frequency bands at 2.5 Ghz and 5.8 Ghz or other LAN allocated channels may also employed. These frequency bands are given by way of example and represent governmental regulatory frequency restrictions rather than any technical restriction or limitation of the invention.

Figure 4:
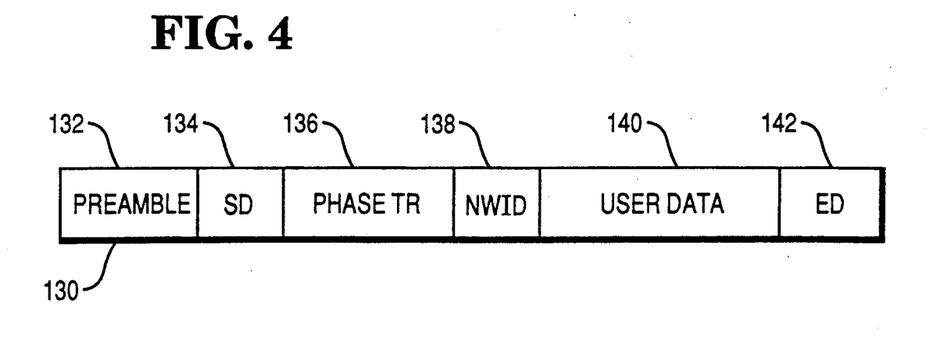
FIG. 4 is a representation of the frame format employed by the radio LAN stations of the present invention.

Transmitter 101 generates information signal frames via spread spectrum technology by using 11 chip spreading codes. More specifically, the information signal frame thus generated is depicted in FIG. 4 as frame 130. Frame 130 includes a PREAMBLE 132, a start delimiter (SD) 134, phase training information (PHASE TR) 136, a network identification number (NWID) 138, the USER DATA 140 and an end delimiter (ED) 142. The start delimiter SD, 134, marks the beginning of the information portion of frame 130 and the end delimiter ED, 142, marks the end of frame 130. Both data and non-data symbols are used to transmit the information signals which form a frame. The non-data symbol is a special symbol which is selected such that it can be distinguished from a data symbol by its physical appearance as opposed to its data content. The criteria for selection of non-data symbols will be discussed later.

Different spreading codes are used for the data symbols and the non-data signals transmitted in the frame. More specifically, in the preferred embodiment of the invention, the 11 chip Barker code sequence shown in TABLE 1 below is used as the spreading sequence for the data symbols of frame 130.

TABLE 1

| DATA SYMBOL SPREADING CODE |
|---|
| +1 −1 +1 +1 −1 +1 +1 +1 −1 −1 −1 |

In contrast, the time reversed sequence of the Barker code sequence of TABLE 1 is used as the spreading code for the non-data symbols transmitted in frame 130 and is shown in TABLE 2 below.

TABLE 2

| NON-DATA SYMBOL SPREADING CODE |
|---|
| −1 −1 −1 +1 +1 +1 −1 +1 +1 −1 +1 |

The spread spectrum representation of the information signals of each frame thus generated is modulated on a radio frequency carrier via differential quadrature phase shift keying (DQPSK). The information signals then travel via radio from a particular transmitting station to the remaining stations in the network.

The receiver 115 of a particular station is capable of distinguishing the start delimiter SD and the end delimiter ED from one another. To facilitate this goal, the start and end delimiters transmitted by station 101 include at least one non-data symbol and additional non-data or data symbols. In a preferred embodiment of the invention, the start and end delimiter format is depicted in Table 3 below.

TABLE 3

| START DELIMITER (SD) | N D D D |
|---|---|
| END DELIMITER (ED) | N N D D | in which:

N is a non-data symbol
D is a data symbol

Figure 5:
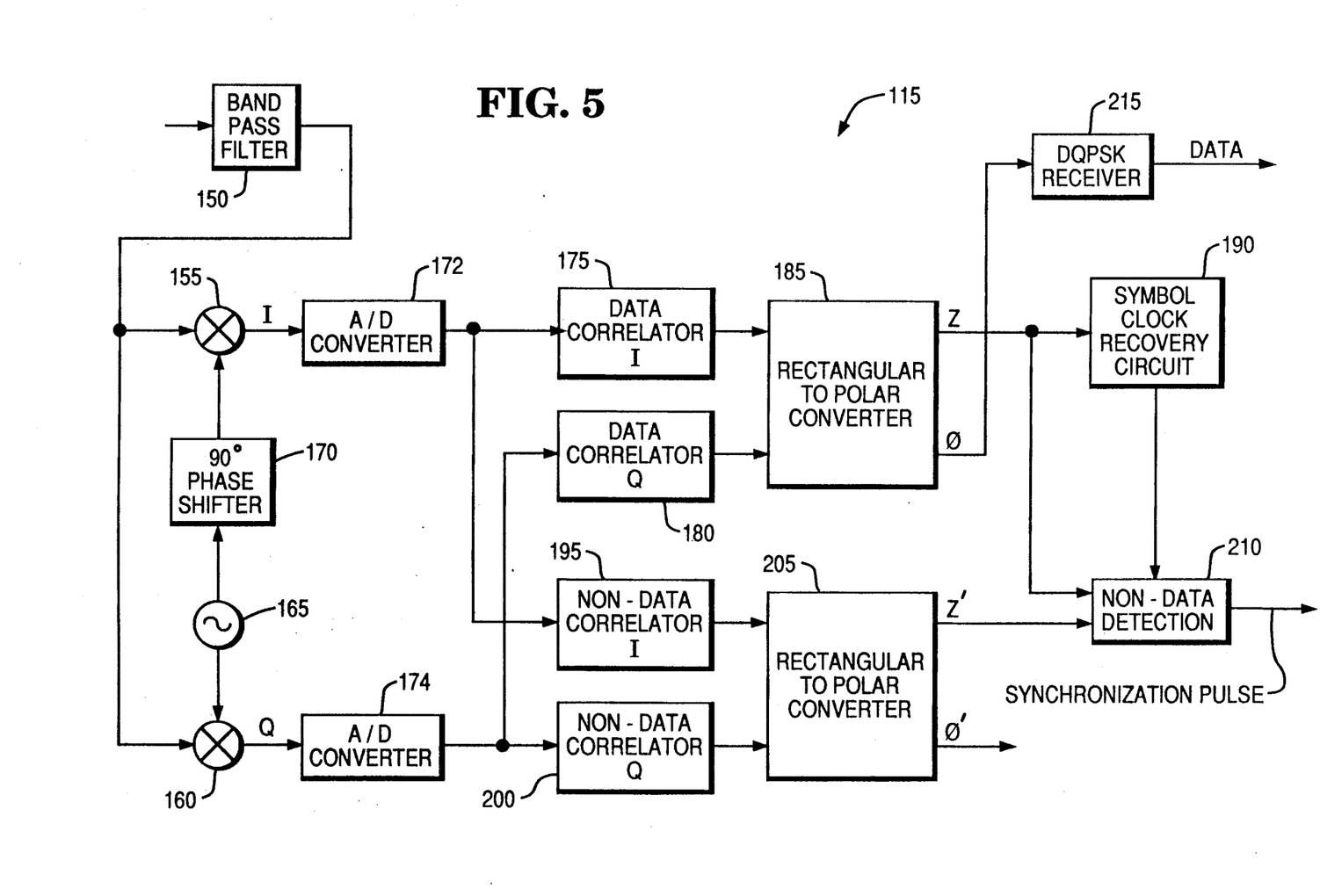
FIG. 5 is a block diagram of the receiver portion of the radio LAN station of the present invention.

In the preferred embodiment of the invention which employs the start and end delimiters depicted above, delimiters each include four (4) symbols, namely one or two data symbols and the remaining symbols are non-data symbols. In this particular embodiment, 4 symbols are used for the delimiters such that the time duration of the delimiter matches the time required by the transmitter to send a byte. In this radio LAN system, one symbol can contain two data bits because a four point constellation (DQPSK) is used for transmission The operation of a receiver 115 which reliably detects the start and end delimiters transmitted by transmitter 110 is now discussed in detail with reference to FIG. 5. Moreover, receiver 115 is capable of detecting the data and non-data signals which are received and which form the received frames of the information signals. The received signal from antenna 120 depicted in FIG. 3 is supplied to the input of a bandpass filter 150 of FIG. 5. The band limited signal thus derived is supplied to mixers 155 and 160. A local oscillator 165 is coupled directly to mixer 160 and via a 90 degrees phase shifter 170 to mixer 155. The outputs of mixer 155 and mixer 160, respectively, provide in phase (I) and quadrature (Q) components as shown in FIG. 5. I and Q base band signals thus result from the down-mixing action provided by mixers 155 and 160.

The I and Q outputs of mixers 155 and 160 are respectively coupled to analog to digital converters 172 and 174. The outputs of analog to digital converters 172 and 174 are respectively coupled to data correlator I, 175, and to data correlator Q, 180, which correlate the I and Q signals with the data spreading sequence or code shown in TABLE 1. Using the data spreading code of TABLE 1 as the key, data correlators 175 and 180 effectively "de-spread" the received spread spectrum signal and retrieve a representation of the original data (as opposed to non-data) information stored in the frame. The outputs of data correlators 175 and 180 are coupled to respective inputs of a rectangular to polar conversion circuit 185. Conversion circuit 185 includes a "Z" output which provides the length of the vector which results from the rectangular to polar conversion process for the data symbols. The "Z" output of conversion circuit 185 is coupled to an input of a symbol clock recovery circuit 190. Conversion circuit 185 also includes a "$\phi$" or phi output at which the angular component of the vector is provided.

The outputs of analog to digital converters 172 and 174 are also respectively coupled to non-data correlator I, 195, and to non-data correlator Q, 200, which correlate the I and Q signals with the non-data spreading sequence or code shown in TABLE 2. Using the non-data spreading code of TABLE 2 as the key, data correlators 195 and 200 "de-spread" the received spread spectrum signal and retrieve a representation of the original non-data information stored in the frame. The outputs of data correlators 195 and 200 are coupled to respective inputs of a rectangular to polar conversion circuit 205. Conversion circuit 205 includes a "Z'" output which provides the length of the vector which results from the rectangular to polar conversion process for the non-data symbols.

The "Z'" output of conversion circuit 205 is coupled to an input of a non-data detection circuit 210. The "Z" output of conversion circuit 185 is coupled to another input of non-data detection circuit 210. The non-data detection circuit 210 compares the length (Z') of the non-data correlator output vector with the length (Z) of the data correlator output vector only on the symbol timing moment. The criteria for non-data detection circuit 210 determination of whether a particular symbol is a data symbol or a non-data symbol is given in TABLE 4 below.

TABLE 4

RECEIVED SYMBOL IS A "DATA SYMBOL" IF:
$Z - Z' \geq A$
RECEIVED SYMBOL IS A "NON-DATA SYMBOL" IF:
$Z - Z' < A$
wherein:
A is a constant
Z is the vector length of the data
correlator output at the symbol
clock moment
Z' is the vector length of the non-data
correlator output at the symbol
clock moment It is noted that A is a constant which was found after tuning to optimize the trade off between the probability of a false non-detect and failing to detect a non-data symbol in the presence of channel distortion. In the preferred embodiment of the invention, the constant A was found to have a value of zero although other values of A suitable for compensation for the unbalance in the ratio of data symbols to non-data symbols, e.g., a ratio of 1000:1, may be used. Such values may be less than zero. The output of non-data detection circuit 210 thus provides a series of synchronization pulses which correspond to the timing moment or timing points of the non-data symbols. The non-data detection circuit 210 is provided with symbol clock recovery information by symbol clock recovery circuit 190.

The $\phi$ output of rectangular to polar conversion circuit 185 is coupled to an input of a differential quadrature phase shift keying (DQPSK) receiver 215 to finally recover the data and provide the data in its original pre-transmission form.

Figure 6:
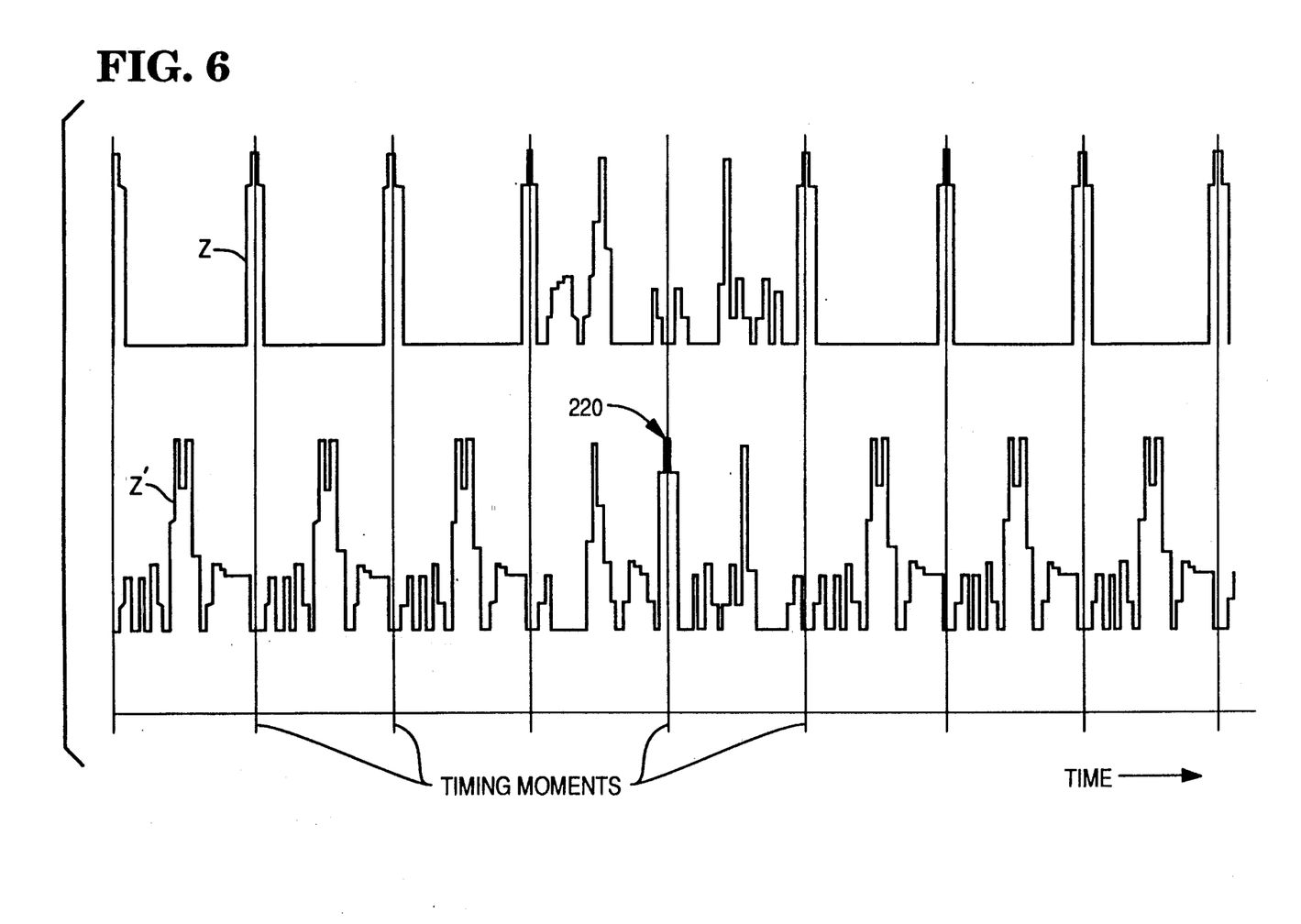
FIG. 6 is an amplitude vs. time graph of the Z and Z' vector lengths produced by the rectangular to polar conversion circuitry of the present invention.

FIG. 6 shows the vector lengths Z and Z' associated with the data and non-data correlator outputs in an example wherein only one non-data symbol is received in the middle of all the data symbols. The vector lengths Z and Z' are depicted as a function of time in FIG. 6. More specifically, the upper portion of FIG. 6 shows the vector length Z which is produced at the output of the rectangular to polar conversion circuit 185 coupled to the data correlators 175 and 180. The lower portion of FIG. 6 shows the vector length Z' which is produced at the output of the rectangular to polar conversion circuit 205 coupled to the non-data correlators 195 and 200. The crosstalk exhibited by data symbols on Z' is limited at the symbol timing moment and at that time, $Z-Z' > A$. In the middle between the two timing moments, Z' gives high values or peaks. Since these peaks are as far as possible from the symbol timing moment, the influence of distortion is very small.

When a non-data symbol is received as seen in the lower portion of FIG. 6, the Z' signal exhibits a peak at the symbol timing moment shown at 220. The symbol synchronization point is found when $Z-Z' < A$. FIG. 6 demonstrates then when a non data symbol is received by receiver 115, this event causes crosstalk in the data correlator output Z. Because the timing recovery circuitry employed in receiver 115 uses an integrated version of the vector length Z, such crosstalk does not significantly influence the symbol timing clock or synchronization pulse generated at the output of symbol clock recovery circuit 190. The symbol clock recovery circuit 190 determines the symbol clock moment based on an integrated version of the vector length Z. Various clock recovery schemes may be used for this purpose, such as, for example, that shown in U.S. patent application Ser. No. 633,697 filed Dec. 24, 1990 and assigned to the assignee of the present invention.

Since differential phase shift keying is used in the above described apparatus, the data bits which form received symbols are derived from the difference between the phase of the currently received symbol and the phase of the previously received symbol. It will be recalled that in FIG. 5, $\phi$, was used to denote the phase information generated at the $\phi$ output of converter 185. It is noted that the first data (D) symbol following a non-data symbol (N) or non-data symbols has no phase reference. More specifically, the output of the data correlator I and data correlator Q cannot be used as a phase reference at the moment in time when a non-data symbol is being received since no data symbol has been transmitted. However, this problem can be resolved when the $\phi$ or phase input of DQPSK receiver 215 is switched from the $\phi$ output of converter 185 (associated with the data correlators) to the $\phi''$ output of conversion circuit 205 (associated with the non-data correlators). When this rearrangement is implemented, the first data symbol following a non-data symbol has the phase of the non-data symbol as a phase reference.

By way of summary, the present invention involves a radio LAN station or transceiver which is readily capable of distinguishing frame delimiters such as the start delimiter SD and the end delimiter ED from other information in a frame. The start delimiter SD provides synchronization during a frame to permit detection of user data, network ID number and the phase compensation training sequence. The end delimiter marks the end of the frame.

To facilitate accomplishment of the goal of readily distinguishing the delimiters and the other goals discussed above, transmitters 110 employ spread spectrum technology to transmit delimiters which are made up of both data and non-data symbols. The non-data symbols are regarded as being special symbols. Transmitters 115 transmit the data symbol via spread spectrum by using a first spreading sequence or code to spread the data symbols. Transmitters 115 transmit the non-data symbols via spread spectrum by using a second spreading sequence or code to spread such non-data symbols. Once the data and non-data symbols are spread in the manner described above, these symbols are transmitted via differential quadrature phase shift keying.

The non-data symbols are selected such that they can be distinguished from data symbols by virtue of the physical appearance of the non-data symbol, not its information content. One technique for creating non-data symbols in a spread spectrum environment is to choose a spreading code for the non-data symbols which is orthogonal to the spreading code for the data symbols. In that case, receiver 115 would contain two receive paths each containing a correlator pair for complex valued input signals. The correlator pair (175 and 180) in a first receive path would correlate against the first data spreading code and the correlator pair (195 and 200) in the second receive path would correlate against the second non-data spreading code. Peak signals appearing at the output of the second receive path (non-data correlator path) indicate a detection of the non-data symbol which provides the receiver with bit synchronization.

The preferred embodiment of the invention employs a 11 chip Barker sequence as the spreading code for data as shown in TABLE 1 and discussed earlier in detail. However, there is no known 11 chip code which is orthogonal to an 11 chip Barker sequence. It has been discovered that it is not necessary to select data and non-data spreading codes which are completely orthogonal. Rather it was found that the data and non-data spreading codes selected should provide a minimum of "crosstalk" between the two receive paths at the symbol timing moment. Crosstalk is defined to refer to the output of the non-data correlators caused by reception of data symbols and the output of the data correlators caused by reception of non-data symbols.

With respect to the 11 chip Barker code for data symbols, one non-data spreading code which meets the requirements expressed above is the time-reversed Barker code shown in TABLE 2. When this choice of time reversed spreading codes is used, the crosstalk has a maximum in the middle of two symbol timing moments. In other words, when data symbols are transmitted, the non-data correlators (195 and 200) give output samples in the middle of the symbol timing moments as seen in FIG. 5.

One receiver structure which is capable of receiving and detecting the data and non-data symbols which are encoded in the above described manner is receiver 115 shown in FIG. 5 and discussed earlier. Receiver 115 is capable of distinguishing the start and end delimiters from the remaining information in the received frames as described above.

While a radio LAN station with improved delimiter detection capability in a spread spectrum environment has been described above, it is clear that a method for detecting start and end delimiters sent to a radio LAN station has also been disclosed. In the disclosed method, the start and end delimiters include both data symbols and non-data symbols, the data symbols and non-data symbols being transmitted via a spread spectrum signal and being spread via first and second spreading codes, respectively. The method includes the steps of correlating, by the LAN station, of a digital representation of the spread spectrum signal against the first spreading code to produce a rectangular representation of the data symbols. The method also includes the step of correlating, by the LAN station, of a digital representation of the spread spectrum signal against the second spreading code to produce a rectangular representation of the non-data symbols. The method further includes the step of converting, by the LAN station, of the rectangular representation of the data symbols into a polar representation of the data symbols to produce a vector length Z representative thereof. The method still further includes the step of converting, by the LAN station, of the rectangular representation of the non-data symbols into a polar representation of the non-data symbols to produce a vector length Z' representative thereof. The method also includes the step of determining that a symbol is a data symbol if Z—Z' is greater or equal to a constant A or that a symbol is a non-data symbol if Z—Z1 is less than the constant A, such that the data and non-data symbols representing the start and end delimiters are detected.

The foregoing describes an apparatus and method for achieving improved delimiter detection in a radio LAN station in a spread spectrum environment. The described LAN station desirably distinguishes start and end delimiters of an information frame from the remaining content of the frame. The disclosed station employs a start delimiter and end delimiter protocol which does not significantly increase network overhead. Moreover, the disclosed LAN station employs a start delimiter and end delimiter protocol wherein the detection of the delimiters is more reliable than the detection of data such that delimiter reliability does not significantly influence the frame error rate. Furthermore, in the disclosed station the probability is low that a delimiter is detected when data was actually transmitted or that the delimiter is missed when a delimiter is actually transmitted.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A radio LAN station for receiving information frames including start and end delimiters, said start and end delimiters including data symbols and non-data symbols, said data symbols and non-data symbols being transmitted via a spread spectrum signal and being spread via first and second spreading codes, respectively, said station comprising:

analog to digital conversion means adapted to provide a digital representation of a received spread spectrum signal;

first correlating means, coupled to said analog to digital conversion means, for correlating a digital representation of said spread spectrum signal against said first spreading code to produce a rectangular representation of said data symbols;

second correlating means, coupled to said analog to digital conversion means, for correlating a digital representation of said spread spectrum signal against said second spreading code to produce a rectangular representation of said non-data symbols;

first converting means, coupled to said first correlating means, for converting said rectangular representation of said data symbols into a polar representation of said data symbols to produce a vector length Z representative thereof;

second converting means, coupled to said second correlating means, for converting said rectangular representation of said non-data symbols into a polar representation of said non-data symbols to produce a vector length Z' representative thereof; and means for determining that a symbol is a data symbol if Z—Z' is greater than or equal to a constant A, or that a symbol is a non-data symbol if Z—Z1 is less than said constant A, such that the data and non-data symbols representing said start and end delimiters are detected.

2. A radio LAN station for receiving information frames including start and end delimiters, said start and end delimiters including data symbols and non-data symbols, said data symbols and non-data symbols being transmitted via a spread spectrum signal and being spread via first and second spreading codes, respectively, said station comprising:

down-converting means for down-converting said spread spectrum signal to produce a down-converted spread spectrum signal;

analog to digital conversion means, coupled to said down-converting means, for providing a digital representation of said down-converted spread spectrum signal;

first correlating means, coupled to said analog to digital conversion means, for correlating a digital representation of said down-converted spread spectrum signal against said first spreading code to produce a rectangular representation of said data symbols;

second correlating means, coupled to said analog to digital conversion means, for correlating a digital representation of said down-converted spread spectrum signal against said second spreading code to produce a rectangular representation of said non-data symbols;

first converting means, coupled to said first correlating means, for converting said rectangular representation of said data symbols into a polar representation of said data symbols to produce a vector length Z representative thereof;

second converting means, coupled to said second correlating means, for converting said rectangular representation of said non-data symbols into a polar representation of said non-data symbols to produce a vector length Z' representative thereof; and comparing means, coupled to said first and second converting means, for comparing said vector lengths Z and Z' to determine that a symbol is a data symbol if Z—Z' is greater or equal to a constant A, or that a symbol is a non-data symbol if Z—Z1 is less than said constant A, such that the data and non-data symbols representing said start and end delimiters are detected.

3. A method for detecting start and end delimiters sent to a radio LAN station, said start and end delimiters including data symbols and non-data symbols, said data symbols and non-data symbols being transmitted via a spread spectrum signal and being spread via first and second spreading codes, respectively, said method comprising the steps of:

correlating, by said LAN station, of a digital representation of said spread spectrum signal against said first spreading code to produce a rectangular representation of said data symbols;

correlating, by said LAN station, of a digital representation of said spread spectrum signal against said second spreading code to produce a rectangular representation of said non-data symbols;

converting, by said LAN station, of said rectangular representation of said data symbols into a polar representation of said data symbols to produce a vector length Z representative thereof;

converting, by said LAN station, of said rectangular representation of said non-data symbols into a polar representation of said non-data symbols to produce a vector length Z' representative thereof; and determining that a symbol is a data symbol if Z—Z' is greater or equal to a constant A or that a symbol is a non-data symbol if Z—Z1 is less than said constant A, such that the data and non-data symbols representing said start and end delimiters are detected.

4. A method of detecting start and end delimiters transmitted from a first LAN station to a second LAN station, said first station transmitting a frame of information including said start and end delimiters, said start and end delimiters each including a sequence of data and non-data symbols, said data symbols being transmitted by spread spectrum via a first spreading code, said non-data symbols being transmitted by spread spectrum via a second spreading code, thus generating a spread spectrum signal, said method comprising the steps of:

down-converting, by said second station, of said spread spectrum signal;

converting, by said second station, of said spread spectrum signal from analog to digital thus producing a digital representation of said spread spectrum signal;

correlating, by said second station, of said digital representation of said spread spectrum signal against said first spreading code to produce a rectangular representation of said data symbols;

correlating, by said second station, of said digital representation of said spread spectrum signal against said second spreading code to produce a rectangular representation of said non-data symbols;

converting, by said second station, of said rectangular representation of data symbols into a polar representation of said data symbols to produce a vector length Z representative thereof;

converting, by said second station, of said rectangular representation of said non-data symbols into a polar representation of said non-data symbols to produce a vector length Z' representative thereof;

comparing, by said second station, of said length Z with sad length Z'; and determining that a symbol is a data symbol if Z—Z' is greater or equal to a constant A or that a symbol is a non-data symbol if Z—Z1 is less than said constant A, such that the data and non-data symbols representing said start and end delimiters are detected.

5. A method for use in a radio LAN station for distinguishing start and end frame delimiters from data in a transmitted signal frame, each start delimiter providing synchronization during a corresponding signal frame for detection of data, the transmitted signal frame being transmitted via spread spectrum signal, the method including the steps of:

forming the frame delimiters in combinations of data and non-data symbols; and transmitting sequentially the data symbols using a first spreading code and the non-data symbols using a second spreading code, the first spreading code being generally orthogonal to the second spreading code.

6. The method of claim 5 and further including the steps of:

receiving said data signals and said non-data signals in said spread spectrum radio signal in a sequential format;

correlating said spread spectrum radio signal to said first spreading code to recover said data signals; and correlating said spread spectrum radio signal to said second spreading code to recover said non-data signals.

7. A radio receiver for receiving a spread spectrum signal comprising:

first receiving means for receiving data signals transmitted in said spread spectrum signal; and second receiving means, coupled to said first receiving means, for receiving non-data signals transmitted in said spread spectrum signal, non-data signals being generally orthogonal to said data signals and further being sequentially received with respect to said data signals.

8. A radio receiver for local area network comprising:

an input to which a spread spectrum signal is provided;

first receiving means, coupled to said input, for receiving data signals transmitted in said spread spectrum signal and including means for recovering said data signals from said spread spectrum signal, said data signals being spread by a first spreading code; and second receiving means, coupled to said input, for receiving non-data signals transmitted in said spread spectrum signal and including means for recovering said non-data signals, said non-data signals being spread by a second spreading code, said non-data signals being generally orthogonal to said data signals and further being sequentially recovered with respect to said data signals.

9. The radio receiver of claim 8 wherein said first receiving means includes first correlating means for correlating said spread spectrum signal to said first spreading code to recover said data signals.

10. The radio receiver of claim 9 wherein said second receiving means includes second correlating means for correlating said spread spectrum signal to said second spreading code to recover said non-data signals.

* * * * *